United States Patent [19]
Byun

[11] Patent Number: 5,309,671
[45] Date of Patent: May 10, 1994

[54] STACK TYPE PLANT-POTS

[76] Inventor: Bok K. Byun, 949-1 Siheung-Dong, Kuro-Ku, Seoul, Rep. of Korea

[21] Appl. No.: 882,019

[22] Filed: May 13, 1992

[51] Int. Cl.$^5$ .............................................. A01G 25/00
[52] U.S. Cl. ............................................. 47/83; 47/71
[58] Field of Search ............................... 47/82, 83, 71

[56] References Cited

U.S. PATENT DOCUMENTS

| | | | |
|---|---|---|---|
| 3,183,624 | 5/1965 | Swett | 47/83 |
| 3,374,574 | 3/1968 | Haile | 47/83 |
| 3,686,791 | 8/1972 | Mills | 47/83 |
| 4,736,543 | 4/1988 | Erdmann | 47/82 |

FOREIGN PATENT DOCUMENTS

| | | | |
|---|---|---|---|
| 142471 | 5/1985 | European Pat. Off. | 47/83 |
| 144061 | 12/1935 | Fed. Rep. of Germany | 47/83 |
| 3447485 | 7/1986 | Fed. Rep. of Germany | 47/82 |

Primary Examiner—Henry E. Raduazo
Attorney, Agent, or Firm—Birch, Stewart, Kolasch & Birch

[57] ABSTRACT

A stack type plant-pot is divided into radially extending pot portions by means of partitions. Each plant-pot includes radially extending pot portions of a similar shape. The pot portions are stacked crisscross with those of another plant-pot embodying the present invention, thus providing wider cultivation areas. The plant-pot of the present invention has a wider upper periphery and a narrower lower periphery and has stacking features, for example, an upper stepped portion and a lower extension. With this arrangement, the amount of yield and cultivation may be increased within a limited area.

10 Claims, 3 Drawing Sheets

STACK TYPE PLANT-POTS

BACKGROUND OF THE INVENTION

1. Field of the Invention

This invention relates to a plant-pot for cultivation of flowers or farm produce, and more particularly to a stack type plant-pot which comprises radially extending several plant-pot portions which are displaced crisscross when the plant-pots are stacked up to provide wider cultivation spaces.

2. Description of Related Art

Recently, a world population has been increased explosively and an industrial construction has been greatly changed. Accordingly, arable land available is in inverse proportion to the population increase. To increase crop output per unit area, various studies about, for example, plant breeding have been made.

A typical plant-pot such as a flower-pot generally is of cylindrical or square shape, wherein the arable space is limited only to the area occupied by the typical plant-pot. Furthermore, since the typical plant-pot is not of a stack type, the cultivation of plants is limited only to a plane surface area which is occupied by the typical plant-pots. Consequently, an increase of the amount of cultivation or crops can not be expected. In addition, in a narrow space, for example small apartment, it is inconvenient to cultivate various kinds of flowering plants by the use of the typical plant-pots and it is confusing to take care of the scattered typical plant-pots.

SUMMARY OF THE INVENTION

An object of the present invention is to provide a stack type plant-pot which is divided into several radially extending pot portions which are stacked crisscross, thus providing wider cultivation spaces within a limited area. By utilizing the stack type plant-pot of the present invention, it becomes easy to cultivate plants or farm produce within a narrow area and the amount of cultivation and crops per unit area may be increased.

A stack type plant-pot according to the present invention has a wider upper periphery and a narrower lower periphery and comprises radially extending plant-pot portions formed by partitions, the partitions having upper stepped ends to fixedly engage with a stack type plant-pot to be displaced thereon, each of the plant-pot portions having a lower extension having central recesses to fixedly mount on the upper stepped ends of a stack type plant-pot to be displaced thereunder, whereby the pot portions of the upper plant-pot are stacked crisscross with those of the lower plant-pot.

Other objects, advantages and capabilities of the present invention will become apparent from the following detailed description, taken in conjunction with the accompanying drawings illustrating a preferred embodiment of the invention.

DETAILED DESCRIPTION OF A PREFERRED EMBODIMENT

Figure 1:
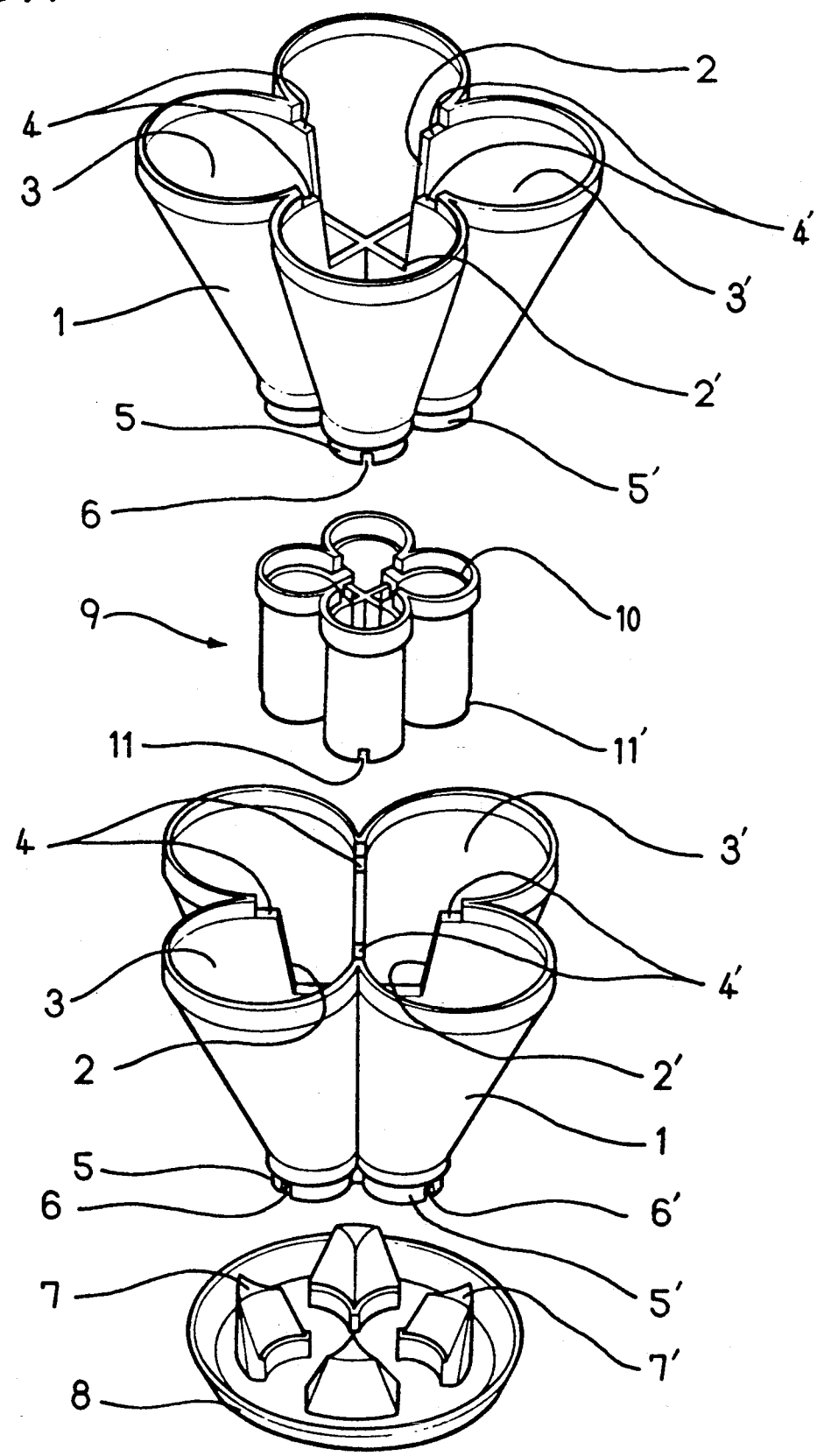
FIG. 1 is a perspective view of the stack type plant-pot of the present invention, wherein upper and lower pots are shown.
Figure 2C:
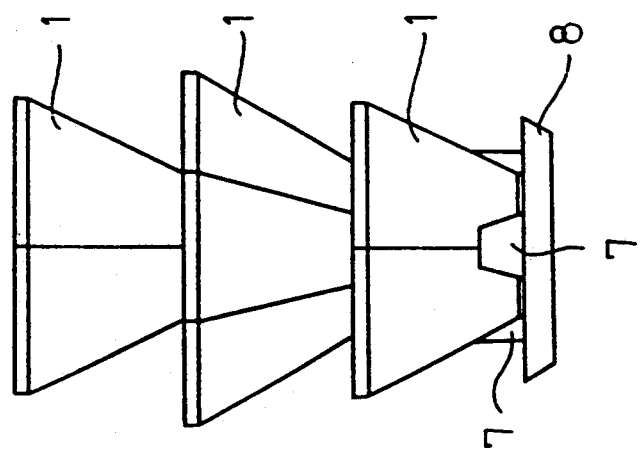
FIGS. 2-A, B and C show the stack type plant-pot of the present invention in stacked up position.
Figure 2B:
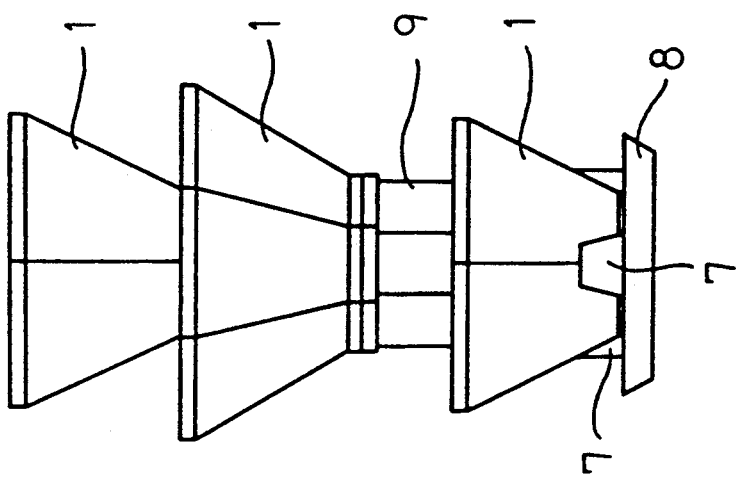
Figure 2A:
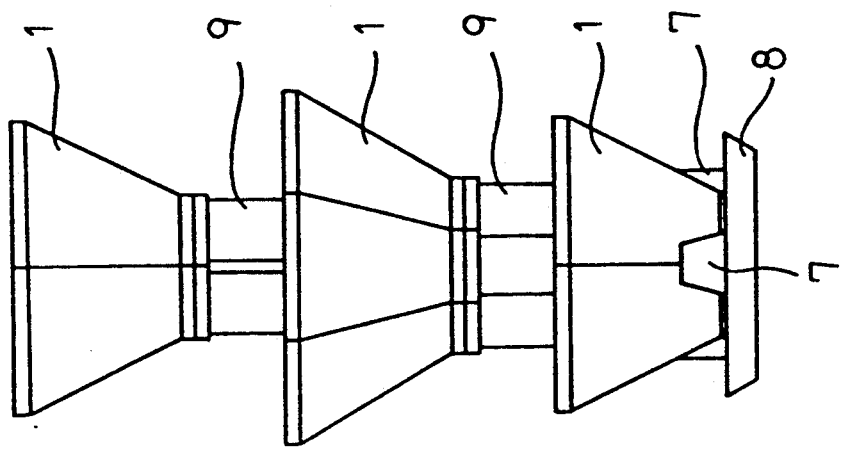

Referring to the drawings, there are shown upper and lower stack type plant-pots of the present invention to be stacked one over the other. Each stack type plant-pot 1 has a wider upper periphery and a narrower lower periphery and is divided into several radially extending plant-pot portions 3 and 3' by means of partitions 2 and 2'. The partitions 2 and 2' have upper stepped portions 4 and 4' to fixedly engage with the upper stack type plant-pot. Each stack type plant-pot 1 has lower extensions 5 and 5' having pot central recesses 6 and 6' formed therein. The length of the periphery of the lower extensions 5 and 5' corresponds to the distance between the upper stepped portions 4 and 4'.

The upper and lower stack type plant-pots 1 of the present invention are stacked up one over the other by the engagement of the upper stepped portions 4 and 4' with the mating lower extensions 5 and 5', with the plant-pot portions 3 and 3' of the upper and the lower plant-pots being stacked crisscross.

A base plate 8 has upward, slanting protrusions 7 and 7' which are of such configuration as to engage with the lower extensions 5 and 5'. A distance adjustable member 9 has an upper ledge 10 for mounting the lower extensions 5 and 5' thereon and lower recesses 11 and 11', the lower recesses 11 and 11' being provided at the same locations and having the same size as the pot central recesses 6 and 6'.

The base plate 8 engages fixedly with the bottom face of the lower stack type plant-pot 1, thus providing a stable stack of plant-pots. The distance adjustable member 9 adjusts the distance between the upper and the lower stack type plant-pots 1 of the present invention. The numerals 12 and 12' designate a drain outlet.

The operation and effect of the stack type of the present invention is hereinafter described in detail.

The stack type plant-pot 1 of the present invention for cultivation of flowering plants is divided into several plant-pot portions 3 and 3'. Each of the pot portions 3 and 3' serves as an independent plant-pot.

The lower extensions 5 and 5' of the upper plant-pot 1 are displaced crisscross with those of the lower plant-pot 1. When the stack type plant-pots 1 are stacked up, the pot central recesses 6 and 6' of the upper plant-pot 1 are mounted on the upper stepped portions 4 and 4' of the lower plant-pot 1. Accordingly, the plant-pot portions 3 and 3' of the lower plant-pot 1 are displaced crisscross with those of the upper plant-pot 1 so that wider cultivation spaces may be provided.

The lower extensions 5 and 5' of the lowermost stack type plant-pot 1 of the present invention engage with the upward, slanting protrusions 7 and 7' on the base plate 8. The base plate 8 has a comparatively larger diameter to prevent the stacked pots 1 from collapsing when the center of gravity of the stacked plant-pots 1 moves upward, that is, when more stack type plant-pots are stacked up. The upward, slanting protrusions 7 and 7' have such shape as to engage with the lower extensions 5 and 5', thus providing a stable stack of the plant-pots.

Each of the plant-pot portions 3 and 3' has a wider upper periphery and a narrower lower periphery and is extended radially. With this construction, the crisscross assembly of upper and lower plant-pot portions 3 and 3' is achieved, thus providing wider cultivation spaces and thus, providing multi-layer cultivation of farm produce.

Compared with the occupied area of the typical single plant-pot, the crops per the unit area by using the stack type plant-pot of the present invention may be increased by several hundred percent as more stack type plant-pots are stacked up.

In particular, the stack type plant-pots of the present invention are more effective when a shaded lot plant, such as lettuce is cultivated therein. Furthermore, with the stack type plant-pots of the present invention, the arable land can be well utilized.

In case the plant to be cultivated is too high or when it is disired to change the appearance of the stack type plant-pots of the present invention, the distance between the plant-pots may be widened. For this purpose, more than one distance adjustable member 9 may be provided. The distance adjustable member 9 has the ledge 10 for mounting the lower extensions 5 and 5' thereon and has the lower recesses 11 and 11' for engaging with the upper stepped ends 4 and 4'. With this distance adjustable member 9, the widening of the distance between and the stable positioning of the stack type plant-pots of the present invention may be obtained at the same time. Of course, when the member 9 is not necessary, it may be released from the plant-pots.

Figure 3C:
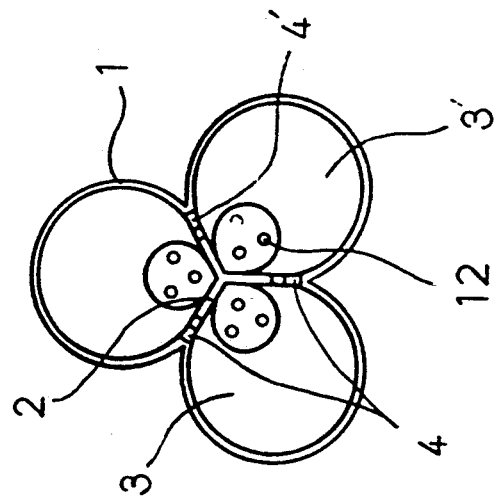
FIGS. 3-A B and C show the stack type plant-pot of the present invention when used in a plane.
Figure 3B:
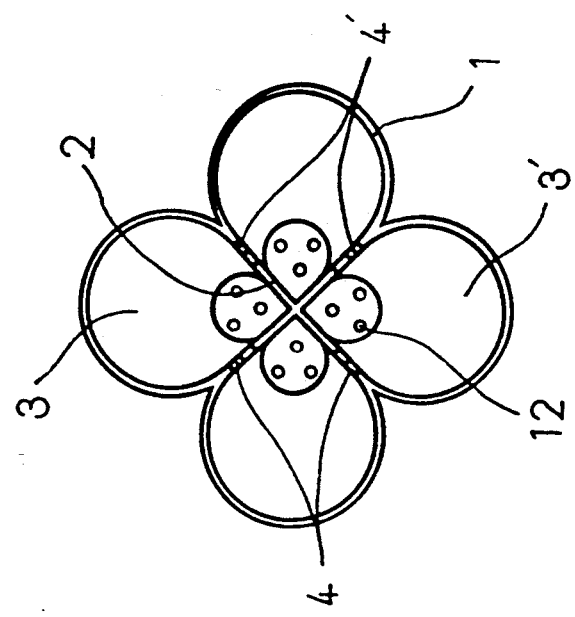
Figure 3A:
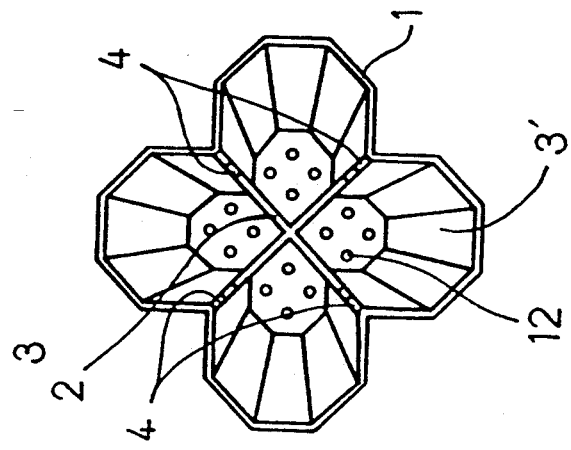

In FIG. 3, the plant-pot portions are extended radially in three or four directions. It is within the scope of the present invention that the plant-pot portions are extended radially in any direction or have any configuration provided that the pot has stack means, for example, the upper stepped portions and lower extensions.

The central pot recesses 6 and 6' function as engagement means and draining means, whereby water within the lower extensions 5 and 5' is drained to the base plate 8.

With the stack type plant-pots having the above-described construction, the arable land may be utilized effectively and the amount of cultivation and crop may be increased per unit area of the farm land. In addition, in a small area, for example, a small apartment, the various kind of flower plants may be cultivated effectively.

What is claimed is:

1. A stack type planter comprising:
   a plurality of plant pot portions, each of said plurality of plant pot portions having an upper peripheral configuration larger than a lower peripheral configuration thereof and edges which are joined to edges of adjacent plant pot portions, said edges and said peripheral portions each defining an interior portion of said planter;
   partition means for vertically separating interior portions of said plant pot portions from each other, said partition means intersecting said joined edges of said plant pot portions;
   upper stepped portions formed at an upper edge of said partition means; and
   a lower extension depending vertically from a bottom peripheral end of each of said plurality of plant pot portions, said lower extension including notched areas formed therein and diagonally offset from the joined edges of said plant pot portions;
   wherein the notch of said lower extension engagingly mates with the upper stepped portion of said partition means for stacking said planter with an identical planter.

2. The stack type planter according to claim 1, wherein said partition means include vertical walls formed between adjacent ones of said plurality of plant pot portions such that a single vertical wall joins a pair of said joined edges together.

3. The stack type planter according to claim 1, further including means for spacing stacked planters by a predetermined vertical distance.

4. The stack type planter according to claim 3, wherein said means for spacing includes a plurality of extension members joined together and corresponding in number to said plurality of plant pot portions, each extension member having a peripheral wall defining an inner peripheral ledge formed adjacent an upper end thereof and a notch formed in a bottom end thereof, the notch engagingly mating with the upper stepped portion of said partition means, and the inner peripheral ledge supporting a bottom peripheral end of said lower extension.

5. The stack type planter according to claim 1, further comprising a supporting base plate having a plurality of protrusions for engaging with a corresponding notch in said lower extension.

6. The stack type planter according to claim 3, further comprising a supporting base plate having a plurality of protrusions for engaging with a corresponding notch in said lower extension.

7. The stack type planter according to claim 4, further comprising a supporting base plate having a plurality of protrusions for engaging with a corresponding notch in said lower extension.

8. The stack type planter according to claim 1, wherein said plurality of plant pot portions from a cloverleaf configuration.

9. The stack type planter according to claim 3, wherein said plurality of plant pot portions form a cloverleaf configuration.

10. The stack type planter according to claim 1, further comprising a planar base in each of said plurality of plant pot portions and a plurality of drainage holes formed in each said planar base.

* * * * *